United States Patent
Shim

(10) Patent No.: US 8,687,001 B2
(45) Date of Patent: Apr. 1, 2014

(54) APPARATUS AND METHOD EXTRACTING LIGHT AND TEXTURE, AND RENDERING APPARATUS USING LIGHT AND TEXTURE

(75) Inventor: Hyun Jung Shim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 597 days.

(21) Appl. No.: 12/948,548

(22) Filed: Nov. 17, 2010

(65) Prior Publication Data

US 2011/0227922 A1 Sep. 22, 2011

(30) Foreign Application Priority Data

Mar. 22, 2010 (KR) ........................ 10-2010-0025286

(51) Int. Cl.
*G06T 15/50* (2011.01)
(52) U.S. Cl.
USPC .......................................................... 345/426
(58) Field of Classification Search
None
See application file for complete search history.

(56) References Cited

U.S. PATENT DOCUMENTS

| 6,639,594 | B2 * | 10/2003 | Zhang et al. | 345/426 |
| 7,583,264 | B2 * | 9/2009 | Nakagawa et al. | 345/426 |
| 7,696,995 | B2 * | 4/2010 | McTaggart | 345/426 |
| 8,131,116 | B2 * | 3/2012 | Motomura et al. | 382/299 |
| 2009/0109240 | A1 * | 4/2009 | Englert et al. | 345/633 |

FOREIGN PATENT DOCUMENTS

| JP | 06-318242 | 11/1994 |
| JP | 2007-174689 | 7/2007 |
| JP | 2008-281402 | 11/2008 |
| KR | 10-2003-0034274 | 5/2003 |
| KR | 10-2005-0054730 | 6/2005 |
| KR | 10-2005-0066501 | 6/2005 |

OTHER PUBLICATIONS

Hara et al., Light Source Position and Reflectance Estimation from a Single View without the Distant Illumination Assumption, IEEE Transaction on Pattern Analysis and Machine Intelligence, vol. 27, No. 4, Apr. 2005.*

* cited by examiner

*Primary Examiner* — Kee M Tung
*Assistant Examiner* — Haixia Du
(74) *Attorney, Agent, or Firm* — Staas & Halsey LLP

(57) ABSTRACT

Provided is a light and texture extracting apparatus and method of rendering, and a rendering apparatus using a light and a texture. Light information applied to an input image and texture information of the input image may be extracted from the input image and the shape information of the input image. The extracted light information and the texture information may be used to render another image for more realistic rendering.

25 Claims, 5 Drawing Sheets

APPARATUS AND METHOD EXTRACTING LIGHT AND TEXTURE, AND RENDERING APPARATUS USING LIGHT AND TEXTURE

CROSS-REFERENCE TO RELATED APPLICATIONS

This application claims the benefit of Korean Patent Application No. 10-2010-0025286, filed on Mar. 22, 2010, in the Korean Intellectual Property Office, the disclosure of which is incorporated herein by reference.

BACKGROUND

1. Field

Example embodiments relate to a light and texture extracting apparatus and method of rendering and a rendering apparatus using a light and a texture, and more particularly, to a rendering apparatus using a light and a texture and a light and texture extracting apparatus and method of rendering that may extract light information and texture information without additionally using a predetermined object.

2. Description of the Related Art

Realistic rendering is one of essential technologies for representing a three-dimensional (3D) image. Components included in the 3D image may include a shape, a light, and a texture. The 3D image may be defined based on the shape, the light, and the texture. The shape may be obtained from a subject through a sensing technology. Therefore, when the light and the texture are accurately obtained from the input image, a more realistic 3D image may be obtained.

SUMMARY

The foregoing and/or other aspects are achieved by providing a light and texture extracting apparatus to perform rendering, the apparatus including a classifying unit to classify an input image into a specular reflection image and a diffuse reflection image, an information extracting unit to extract light information associated with the input image from the classified specular reflection image, the classified diffuse reflection image, and shape information associated with the input image, and a texture information extracting unit to extract texture information associated with the input image from the classified specular reflection image, the classified diffuse reflection image, and the shape information associated with the input image.

The information extracting unit may include a light direction determining unit to determine a light direction of a light corresponding to a specular reflection from the classified specular reflection image, and to determine a light direction of a light corresponding to a diffuse reflection from the classified diffuse reflection image, a light direction map generating unit to combine the light direction of the light corresponding to the specular reflection and the light direction of the light corresponding to the diffuse reflection to generate a light direction map, and a light intensity map generating unit to apply the generated light direction map to the classified specular reflection image to generate a light intensity map.

The light direction determining unit may transform the classified specular reflection image into a binary map, and may apply the transformed binary map and the shape information of the input image to a specular reflection model to determine the light direction of the light corresponding to the specular reflection.

The light direction determining unit may select a non-texture image among the classified diffuse reflection image and may apply the selected non-texture image and the shape information associated with the input image to the diffuse reflection model to determine the light direction of the light corresponding to the diffuse reflection.

The light direction map generating unit may remove identical light directions among one of the light direction of the light corresponding to the specular reflection and the light direction of the light corresponding to the diffuse reflection to generate the light direction map.

With respect to pixels having light directions in the generated light direction map, the light intensity map generating unit may determine target pixels affected by the light directions of the pixels from the specular reflection image, and may determine intensity values of the target pixels as light values of the target pixels to generate the light intensity map.

The texture information extracting unit may apply the shape information of the input image to a specular reflection model to calculate a texture constant corresponding to a specular reflection.

The texture information extracting unit may apply the shape information associated with the input image and the light direction map and the light intensity map calculated by the light information extracting unit to a diffuse reflection model to calculate a texture constant corresponding to the diffuse reflection.

The shape information may include a normal vector of each of a plurality of pixels comprising the input image.

The foregoing and/or other aspects are achieved by providing a method of extracting light and texture to perform rendering, the method including classifying, by at least one processor, an input image into a specular reflection image and a diffuse reflection image, extracting, by the at least one processor, light information associated with the input image from the classified specular reflection image, the classified diffuse reflection image, and shape information associated with the input image, and extracting, by the at least one processor, texture information associated with the input image from the classified specular reflection image, the classified diffuse reflection image, and the shape information of the input image.

The extracting of the light information may include determining a light direction of a light corresponding to a specular reflection from the classified specular reflection image, and to determine a light direction of a light corresponding to a diffuse reflection from the classified diffuse reflection image, generating a light direction map by combining the light direction of the light corresponding to the specular reflection and the light direction of the light corresponding to the diffuse reflection, and generating a light intensity map by applying the generated light direction map to the classified specular reflection image.

The determining may include transforming the classified specular reflection image into a binary map, and applying the transformed binary map and the shape information of the input image to a specular reflection model to determine the light direction of the light corresponding to the specular reflection.

The determining may include selecting a non-texture image among the classified diffuse reflection image, and applying the selected non-texture image and the shape information associated with the input image to a diffuse reflection model to determine the light direction of the light corresponding to the diffuse reflection.

The generating of the light direction map may remove identical light directions among one of the light direction of the light corresponding to the specular reflection and the light direction of the light corresponding to the diffuse reflection to generate the light direction map.

With respect to pixels having light directions in the generated light direction map, the generating of the light intensity map may determine, from the specular reflection image, target pixels affected by the light directions of the pixels, and may determine intensity values of the target pixels as light values of the target pixels to generate the light intensity map.

The extracting may include applying the shape information associated with the input image to a specular reflection model to calculate a texture constant corresponding to a specular reflection.

The extracting may include applying the shape information associated with the input image and the light direction map and the light intensity map calculated by the light information extracting unit to a diffuse reflection model to calculate a texture constant corresponding to the diffuse reflection.

The foregoing and/or other aspects are achieved by providing a rendering apparatus using light and texture, the rendering apparatus including an adding unit to add a new object to an input image and shape information associated with the input image, and a rendering unit to perform rendering of the input image including the new object and the shape information including the new object based on light information applied to the input image and texture information of the input image. Herein, the light information applied to the input image and the texture information of the input image are extracted from the input image and the shape information of the input image.

The foregoing and/or other aspects are achieved by providing a rendering apparatus using light and texture, the rendering apparatus including a storage unit to store light information and texture information applied to an input image, and a rendering unit to perform rendering of the input image and shape information by changing angles of view, light intensities, and light directions based on the stored light information and texture information. Here, the light information applied to the input image and the texture information of the input image are extracted from the input image and the shape information of the input image.

The foregoing and/or other aspects are achieved by providing inverse rendering, by at least one processor, an input image into a specular reflection portion and a diffuse reflection portion, extracting, by the at least one processor, light information from the specular reflection portion and the diffuse reflection portion and shape information including geometric information of the input image, and extracting, by the at least one processor, texture information from the specular reflection portion, the diffuse reflection portion and the shape information.

According to another aspect of one or more embodiments, there is provided at least one non-transitory computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
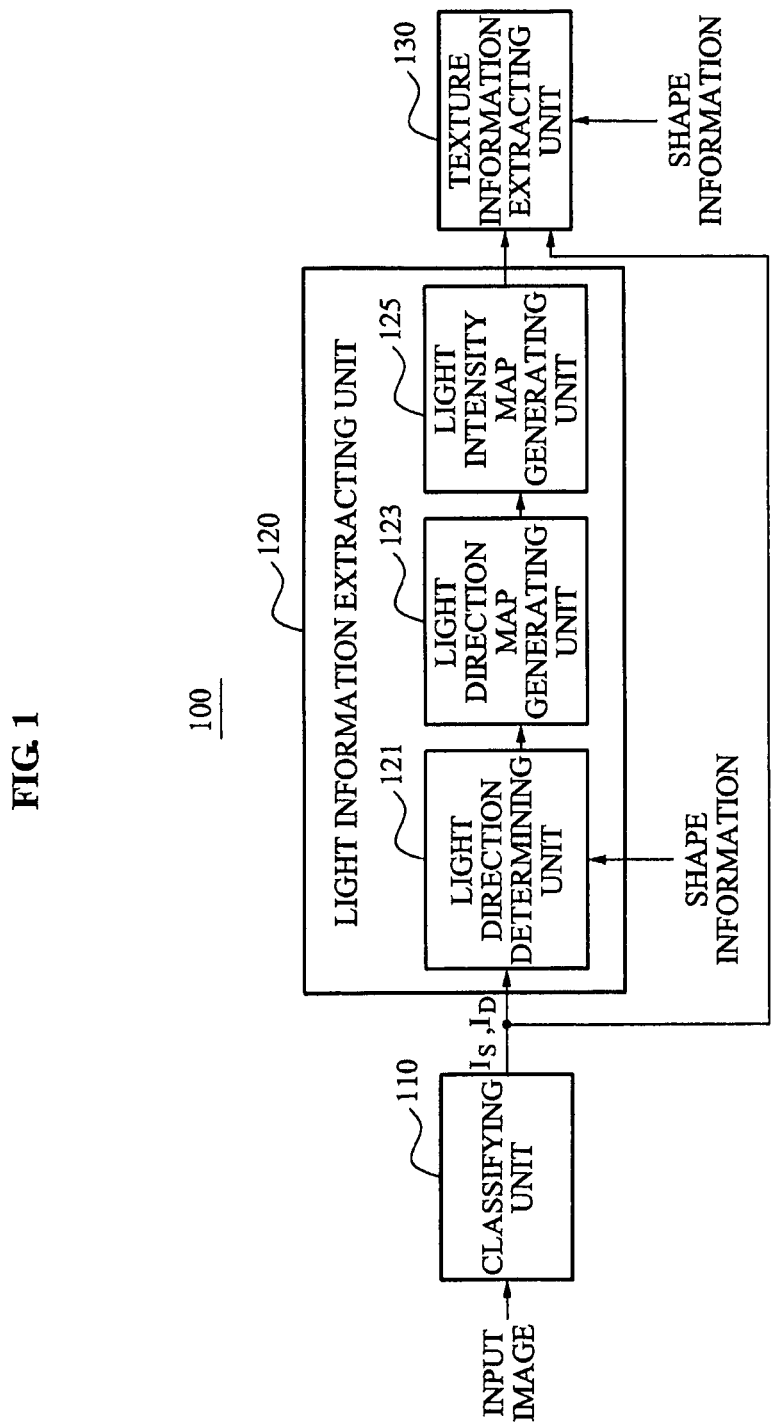
FIG. 1 is a block diagram illustrating an example of a light and texture extracting apparatus to perform rendering according to example embodiments.

Reference will now be made in detail to embodiments, examples of which are illustrated in the accompanying drawings, wherein like reference numerals refer to like elements throughout. Embodiments are described below to explain the present disclosure by referring to the figures.

FIG. 1 illustrates an example of a light and texture extracting apparatus 100 to perform rendering according to example embodiments.

The light and texture extracting apparatus 100 to perform rendering may be an apparatus to extract light information and texture information associated with an input image by performing inverse-rendering of the input image and shape information associated with the input image. The light and texture extracting apparatus 100 may include a classifying unit 110, a light information extracting unit 120, and a texture information extracting unit 130. Herein, the inverse-rendering may obtain the texture information and light information from the input image and the shape information, while forward rendering may obtain image from the texture information, the light information and the shape information.

The classifying unit 110 may classify the input image into a specular reflection image $I_s$ and a diffuse reflection image $I_d$. The input image may be an image taken under an arbitrary light condition, and may be a two-dimensional (2D) image. The specular reflection image $I_s$ may be an image affected by a specular reflection among the input image. Specifically, the specular reflection image $I_s$ may be an image comprising by pixels where a specular reflection occurs among the input image. Similarly, the diffuse reflection image $I_d$ may be an image affected by a diffuse reflection among the input image.

The light information extracting unit 120 may extract light information associated with the input image from the classified specular reflection image $I_s$, classified diffuse reflection image $I_d$, and the shape information associated with the input image. The shape information may provide geometric information of the input image. The shape information associated with the input image may be obtained by sensing the input image using a depth sensor of an image apparatus, and may be a 3D image. The sensed shape information may include a normal vector n with respect to the input image. When the sensed shape information is provided, the normal vector n with respect to the input image may be calculated by differentiating the sensed shape information.

The light information extracting unit 120 may include a light direction determining unit 121, a light direction map generating unit 123, and a light intensity map generating unit 125.

The light direction determining unit 121 may determine a light direction of a light corresponding to a specular reflection from the classified specular reflection image $I_s$. The light direction determining unit 121 may determine a light direction of a light corresponding to a diffuse reflection from the classified diffuse reflection image $I_d$.

Figure 2:
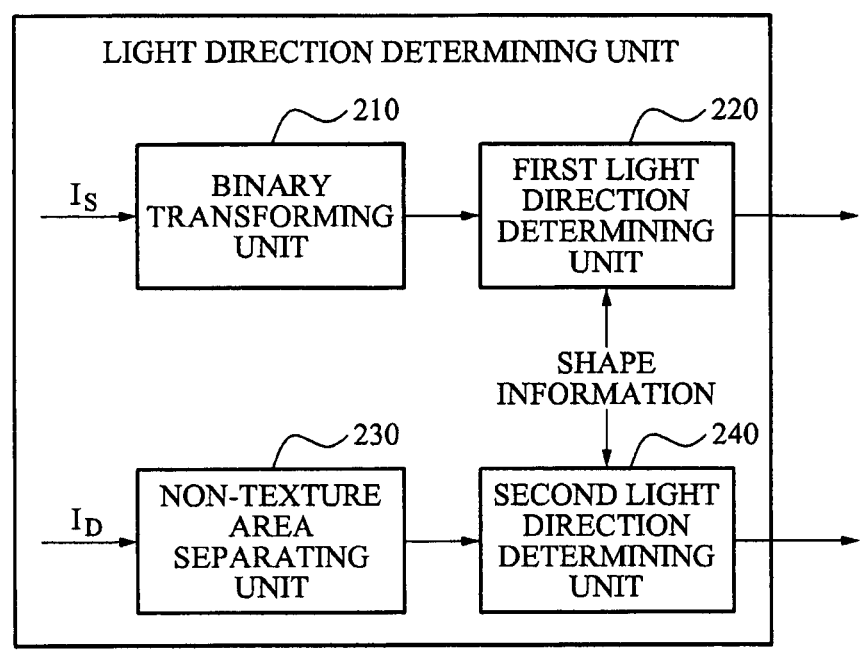
FIG. 2 is a block diagram illustrating a light direction determining unit of FIG. 1 according to example embodiments.

FIG. 2 illustrates the light direction determining unit 121 of FIG. 1 according to example embodiments.

Referring to FIG. 2, the light direction determining unit 121 may include a binary transforming unit 210, a first light direction determining unit 220, a non-texture area separating unit 230, and a second light direction determining unit 240.

The binary transforming unit 210 may transform the classified specular reflection image $I_s$ into a binary map. Therefore, each of a plurality of pixels of the transformed specular reflection image $I_s$ that is transformed into the binary map may have a value of '0' or '1'. A pixel having a value of '0' may indicate, for example, a pixel represented as white since the pixel is affected by the specular reflection, and a pixel having a value of '1' may indicate, for example, a pixel represented as black since the pixel is not affected by the specular reflection.

The first light direction determining unit 220 may determine a light direction of a light corresponding to the specular reflection by applying the binary map and shape information associated with the input image to a specular reflection model. The binary map may be a specular reflection image $I_s$ that is represented as '0' or '1', and, $I_s$ may be referred to as the binary map.

The specular reflection model may be used for formulizing components physically representing the specular reflection. For example, when light information and shape information are given, a pixel value based on the specular reflection may be defined based on the specular reflection model. Examples of the specular reflection model may include Torrance-Sparrow, Cook-Torrance, Phong, Lafortune, Blinn-Phong, and the like. The specular reflection model may be expressed by Equation 1.

$$i_s = \rho_s f_s(n,v,l)$$ [Equation 1]

In Equation 1, $i_s$ denotes an intensity of a pixel to be processed, the pixel being in the specular reflection image that is transformed into the binary map, and $\rho_s$ denotes a specular reflection texture constant wherein $\rho_s$ may have a value of '1', for example. $f_s$ denotes a function of the specular reflection model, n denotes a normal vector, v denotes a view vector, and l denotes a light vector. n may be included in the shape information associated with the input image, and v may be a vector indicating a point of view or a view angle and may be calculated for each pixel based on a relative location between an imaging apparatus and the shape information. v may be provided by the imaging apparatus. Referring to FIG. 1, $i_s$, $\rho_s$, n and v are provided.

Therefore, the first light direction determining unit 220 may substitute $i_s$, $\rho_s$, n and v to Equation 1 to calculate l, and may determine the light direction of the light corresponding to the specular reflection from the calculated l, l being the light vector, and thus, may include information associated with the light direction.

The non-texture area separating unit 230 may separate and select a non-texture image from the classified diffuse reflection image $I_d$.

The second light direction determining unit 240 may determine the light direction of the light corresponding to the diffuse reflection by applying the selected non-texture image and the shape information associated with the input image to a diffuse reflection model. The selected non-texture image may be a part of the diffuse reflection image $I_d$, and, $I_d$ may be referred to as the non-texture image. Herein, the non-texture image may be an image from which a texture component is excluded.

A representative example of the diffuse reflection model may be a Spherical Harmonics Basis Function, and various models may also be used as the diffuse reflection model. The diffuse reflection model may be expressed by Equation 2.

$$i_d = \rho_d f_d(n,l)$$

In Equation 2, $i_d$ denotes an intensity of a pixel to be processed, the pixel being in the selected non-texture image, and $\rho_d$ denotes a diffuse reflection texture constant wherein $\rho_d$ may have a value of '1', for example. $f_d$ denotes a function of the diffuse reflection model, n denotes a normal vector, and l denotes a light vector.

$i_d$, $\rho_d$ and n in Equation 2 may be given as described above with respect to Equation 1. Therefore, the second light direction determining unit 240 may substitute $i_d$, $\rho_d$, and n in Equation 2 to calculate l, and may determine the light direction of the light corresponding to the diffuse reflection from the calculated l. The determined light direction of the light corresponding to the specular reflection and the determined light direction of the light corresponding to the diffuse reflection may be input to the light direction map generating unit 123.

The light direction map generating unit 123 may combine the determined light direction of the light corresponding to the specular reflection and the determined light direction of the light corresponding to the diffuse reflection to generate a light direction map. When identical light directions exist among the light direction of the light corresponding to the specular reflection and the light direction of the light corresponding to the diffuse reflection, the light direction map generating unit 123 may use one of the identical light directions.

The light direction map indicates a light direction. The light direction, namely, a direction of a light of each pixel, may be predetermined. The light direction map may be a binary map, and pixels comprising the light direction map may have '0' or '1'. For example, when a value of a pixel is '1', a light may exist in a direction indicated by the pixel, and when a value of a pixel is '0', a light may not exist in a direction indicated by the pixel.

The light intensity map generating unit 125 may generate a light intensity map by applying the generated light direction map to the classified specular reflection image. The light intensity map may define an intensity of a light having a direction. With respect to pixels having light directions in the generated light direction map, the light intensity map generating unit 125 may determine target pixels affected by the light directions of the pixels from the specular reflection image. The light intensity map generating unit 125 may determine an intensity value of each of the determined target pixels as a light value of each of the target pixels to generate the light intensity map. The light value may be a size of I, namely, an intensity of I.

For example, when a value of a pixel in the light direction map is '1', the light intensity map generating unit 125 may determine a target pixel affected by a light direction of the pixel from the specular reflection image $I_s$. As described above, a light direction of a pixel is predetermined. The light intensity map generating unit 125 may determine the target pixel based on the shape information and a constant of the imaging apparatus.

The light intensity map generating unit 125 may define the intensity value of the determined target pixel as light information. The light intensity map generating unit 125 may apply the described procedure to all pixels having values of '1' to obtain light values, and may combine the obtained light values to generate the light intensity map. Therefore, l having an intensity and a direction may be calculated, and the calculated l may be used as the light information.

The texture information extracting unit 130 may extract texture information associated with the input image from the classified specular reflection image $I_s$, the classified diffuse reflection image $I_d$, and shape information associated with the input image.

First, the texture information extracting unit 130 may calculate $\rho_s$ corresponding to the specular reflection by applying the shape information associated with the input image to the specular reflection model of Equation 1. In Equation 1, $i_s$ denotes an intensity of a pixel to be processed, the pixel in the classified specular reflection image, n is included in the shape information, v is provided by the imaging apparatus, and l is calculated by the light information extracting unit 120. Therefore, the texture information extracting unit 130 may substitute $i_s$, n, v, and l in Equation 1 to calculate $\rho_s$.

The texture information extracting unit 130 may apply the shape information of the input image to the diffuse reflection model of Equation 2 to calculate $\rho^d$ corresponding to the diffuse reflection. In Equation 2, $i_d$ denotes an intensity of a pixel to be processed, the pixel being in the diffuse reflection image, n is included in the shape information, and l is calculated by the light information extracting unit 120. Therefore, the texture information extracting unit 130 may substitute $i_d$, n, l and in Equation 2 to calculate $\rho_d$.

The light direction map, the light intensity map, $\rho_s$, and $\rho_d$ calculated based on the described procedure may be used by an apparatus performing rendering.

Figure 3:
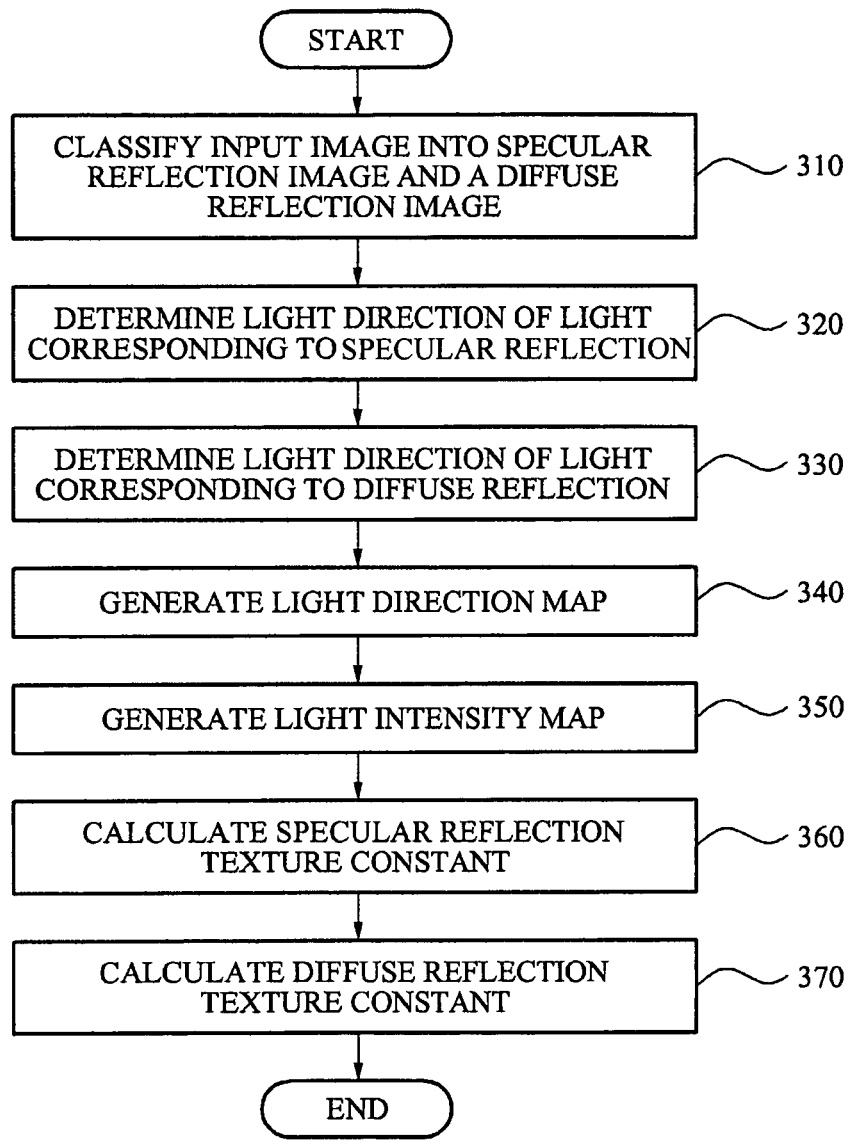
FIG. 3 is a flowchart illustrating an example of a light and texture extracting method of rendering according to example embodiments.

FIG. 3 illustrates an example of a light and texture extracting method of rendering according to example embodiments.

In operation 310, a light and texture extracting apparatus performing rendering classifies an input image into a specular reflection image $I_s$ and a diffuse reflection image $I_d$. Hereinafter, the light and texture extracting apparatus performing rendering is referred to as an apparatus.

In operation 320, the apparatus determines a light direction of a light corresponding to a specular reflection from the classified specular reflection image $I_s$. Specifically, the apparatus may transform the classified specular reflection image $I_s$ into a binary map, and may determine the light direction of the light corresponding to the specular reflection by applying shape information associated with the input image to a specular reflection model.

In operation 330, the apparatus selects a non-texture image from the classified diffuse reflection image $I_d$, and determines a light direction of a light corresponding to a diffuse reflection by applying the selected non-texture image and the shape information associated with the input image to a diffuse reflection model.

In operation 340, the apparatus may combine the light direction of the light corresponding to the specular reflection of operation 320 and the light direction of the light corresponding to the diffuse reflection of operation 330 to generate a light direction map.

In operation 350, the apparatus may apply the light direction map generated in operation 340 to the specular reflection image $I_s$ classified in operation 310 to generate a light intensity map. Specifically, with respect to pixels having light directions in the generated light direction map, the apparatus may determine target pixels affected by the light directions of the pixels from the specular reflection image $I_s$. The apparatus may determine an intensity value of each of the determined target pixels as a light value of each of the target pixels to generate the light intensity map. The light value may be a size of I, namely, an intensity of I.

In operation 360, the apparatus extracts specular reflection texture information associated with the input image from the classified specular reflection image $I_s$ and the shape information associated with the input image. Specifically, the apparatus may apply the input image, the shape information associated with the input image, and light information calculated by operations 320 through 350 to a specular reflection model of Equation 1 to calculate $\rho_s$ corresponding to the specular reflection.

In operation 370, the apparatus may extract diffuse reflection texture information associated with the input image from the diffuse reflection image $I_d$ classified in operation 310 and the shape information associated with the input image. Specifically, the apparatus may apply the input image, the shape information associated with the input image, and light information calculated by operation 320 through 350 to a diffuse reflection model of Equation 2 to calculate $\rho_d$ corresponding to the diffuse reflection.

Figure 4:
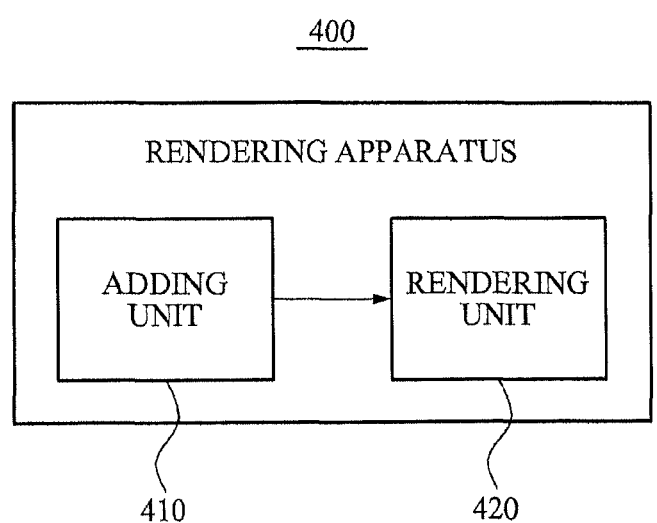
FIG. 4 is a block diagram illustrating a rendering apparatus using a light and a texture according to example embodiments.

FIG. 4 illustrates an example of a rendering apparatus 400 using a light and a texture according to example embodiments.

Referring to FIG. 4, the rendering apparatus 400 using light and texture may include an adding unit 410 and a rendering unit 420.

The adding unit 410 may add a new object to an input image and shape information associated with the input image. The input image may be the same as an input image input to the classifying unit 110 of FIG. 1 or may be different from the input image input to the classifying unit 110 of FIG. 1. The added object may be a virtual object that is arbitrarily added.

The rendering unit 420 may perform rendering of the input image including the object and the shape information including the object based on light information applied to the input image and texture information of the input image. The light information applied to the input image and the texture information of the input image may be light information and texture information extracted from the input image and the shape information. The rendering unit 420 may perform rendering using the light information and the texture information calculated by the example procedure described with reference to FIGS. 1 through 3. Therefore, the rendering apparatus 400 may apply to the object, the light information and the texture information applied to the input image to perform a realistic rendering.

Figure 5:
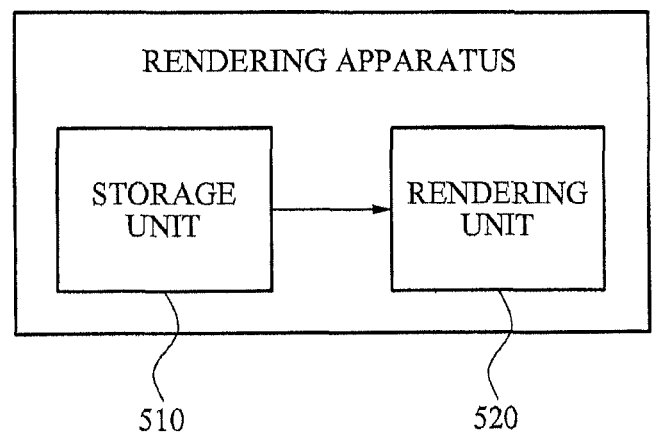
FIG. 5 is a block diagram illustrating a rendering apparatus using a light and a texture according to example embodiments.

FIG. 5 illustrates another example of rendering apparatus 500 using light and texture according to example embodiments.

Referring to FIG. 5, the rendering apparatus 500 using light and texture may include a storage unit 510 and a rendering unit 520.

The storage unit 510 may store light information applied to an input image and texture information of the input image. The stored light information and the texture information may be light information and texture information extracted from the input image and the shape information associated with the input image. Specifically, the stored light information and the texture information may be light information and texture information calculated by the example procedure described with reference to FIGS. 1 through 3.

The rendering unit 520 may perform rendering of the input image and the shape information by changing angles of view, light intensities, and light directions based on the stored light information and texture information. The rendering unit 520 may perform rendering of the input image and the shape information under various conditions, such as various points of view or various light conditions.

The rendering apparatuses 400 and 500 described with reference to FIGS. 4 and 5 may be configured to be embodied in a single apparatus or in a single processor. The apparatuses 100, 400, and 500 described with reference to FIGS. 1, 4, and 5 may be configured to be embodied in a single apparatus or a single processor.

The method according to the above-described example embodiments may also be implemented through non-transitory computer readable code/instructions in/on a medium, e.g., a non-transitory computer readable medium, to control at least one processing element to implement example embodiments. The medium can correspond to medium/media permitting the storing or transmission of the non-transitory computer readable code.

The non-transitory computer readable code can be recorded or transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media. The media may also be a distributed network, so that the non-transitory computer readable code is stored or transferred and executed in a distributed fashion. Still further, as only an example, the processing element could include a processor or a computer processor, and processing elements may be distributed or included in a single device. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter.

In addition to the above described embodiments, example embodiments can also be implemented as hardware, e.g., at least one hardware based processing unit including at least one processor capable of implementing any above described example embodiments.

Although embodiments have been shown and described, it should be appreciated by those skilled in the art that changes may be made in these embodiments without departing from the principles and spirit of the disclosure, the scope of which is defined by the claims and their equivalents.

What is claimed is:

1. An apparatus extracting light and texture to perform rendering, the apparatus comprising:
    a classifying unit to classify an input image into a specular reflection image and a diffuse reflection image;
    an information extracting unit to extract light information including a light vector of at least one light associated with the input image from the classified specular reflection image, the classified diffuse reflection image, and shape information associated with the input image; and
    a texture information extracting unit to extract texture information associated with the input image from the classified specular reflection image, the classified diffuse reflection image, and the shape information associated with the input image.

2. The apparatus of claim 1, wherein the information extracting unit comprises:
    a light direction determining unit to determine a light direction of a light corresponding to a specular reflection from the classified specular reflection image, and to determine a light direction of a light corresponding to a diffuse reflection from the classified diffuse reflection image;
    a light direction map generating unit to combine the light direction of the light corresponding to the specular reflection and the light direction of the light corresponding to the diffuse reflection to generate a light direction map; and
    a light intensity map generating unit to apply the generated light direction map to the classified specular reflection image to generate a light intensity map.

3. The apparatus of claim 2, wherein the light direction determining unit transforms the classified specular reflection image into a binary map, and applies the transformed binary map and the shape information of the input image to a specular reflection model to determine the light direction of the light corresponding to the specular reflection.

4. The apparatus of claim 2, wherein the light direction determining unit selects a non-texture image among the classified diffuse reflection image, and applies the selected non-texture image and the shape information associated with the input image to the diffuse reflection model to determine the light direction of the light corresponding to the diffuse reflection,
    wherein the non-texture image is an image from which a texture component is excluded in the classified diffuse reflection image.

5. The apparatus of claim 2, wherein the light direction map generating unit removes identical light directions among one of the light direction of the light corresponding to the specular reflection and the light direction of the light corresponding to the diffuse reflection to generate the light direction map.

6. The apparatus of claim 2, wherein, with respect to pixels having light directions in the generated light direction map, the light intensity map generating unit determines target pixels affected by the light directions of the pixels from the specular reflection image, and determines intensity values of the target pixels as light values of the target pixels to generate the light intensity map.

7. The apparatus of claim 2, wherein the texture information extracting unit applies the shape information associated with the input image and the light direction map and the light intensity map calculated by the light information extracting unit to a diffuse reflection model to calculate a texture constant corresponding to the diffuse reflection.

8. The apparatus of claim 1, wherein the texture information extracting unit applies the shape information of the input image to a specular reflection model to calculate a texture constant corresponding to a specular reflection.

9. The apparatus of claim 1, wherein the shape information includes a normal vector of each of a plurality of pixels comprising the input image.

10. A method of extracting light and texture to perform rendering, the method comprising:
    classifying, by at least one processor, an input image into a specular reflection image and a diffuse reflection image;
    extracting, by the at least one processor, light information including a light vector of at least one light associated with the input image from the classified specular reflection image, the classified diffuse reflection image, and shape information associated with the input image; and
    extracting, by the at least one processor, texture information associated with the input image from the classified specular reflection image, the classified diffuse reflection image, and the shape information of the input image.

11. The method of claim 10, wherein the extracting of the light information comprises:
    determining a light direction of a light corresponding to a specular reflection from the classified specular reflection image, and to determine a light direction of a light corresponding to a diffuse reflection from the classified diffuse reflection image;

generating a light direction map by combining the light direction of the light corresponding to the specular reflection and the light direction of the light corresponding to the diffuse reflection; and generating a light intensity map by applying the generated light direction map to the classified specular reflection image.

12. The method of claim 11, wherein the determining comprises:

transforming the classified specular reflection image into a binary map, and applying the transformed binary map and the shape information of the input image to a specular reflection model to determine the light direction of the light corresponding to the specular reflection.

13. The method of claim 11, wherein the determining comprises:

selecting a non-texture image among the classified diffuse reflection image, wherein the non-texture image is an image from which a texture component is excluded in the classified diffuse reflection image; and applying the selected non-texture image and the shape information associated with the input image to a diffuse reflection model to determine the light direction of the light corresponding to the diffuse reflection.

14. The method of claim 11, wherein the generating of the light direction map removes identical light directions among the light direction of the light corresponding to one of the specular reflection and the light direction of the light corresponding to the diffuse reflection to generate the light direction map.

15. The method of claim 11, wherein, with respect to pixels having light directions in the generated light direction map, the generating of the light intensity map determines, from the specular reflection image, target pixels affected by the light directions of the pixels, and determines intensity values of the target pixels as light values of the target pixels to generate the light intensity map.

16. The method of claim 10, wherein the extracting comprises applying the shape information associated with the input image to a specular reflection model to calculate a texture constant corresponding to a specular reflection.

17. The method of claim 10, wherein the extracting comprises applying the shape information associated with the input image and the light direction map and the light intensity map calculated by the light information extracting unit to a diffuse reflection model to calculate a texture constant corresponding to the diffuse reflection.

18. The method of claim 10, wherein the shape information includes a normal vector of each of a plurality of pixels comprising the input image.

19. At least one non-transitory computer readable recording medium comprising computer readable instructions that control at least one processor to implement the method of claim 10.

20. A rendering apparatus using light and texture, the rendering apparatus comprising:

an adding unit to add a new object to an input image and shape information associated with the input image; and a rendering unit to perform rendering of the input image including the new object and the shape information including the new object based on light information applied to the input image and texture information of the input image, wherein the light information including a light vector of at least one light applied to the input image and the texture information of the input image are extracted from the input image and the shape information of the input image.

21. A rendering apparatus using light and texture, the rendering apparatus comprising:

a storage unit to store light information and texture information applied to an input image; and a rendering unit to perform rendering of the input image and shape information by changing angles of view, light intensities, and light directions based on the stored light information and texture information, wherein the light information including a light vector of at least one light applied to the input image and the texture information of the input image are extracted from the input image and the shape information of the input image.

22. A method, comprising:

inverse rendering, by at least one processor, an input image into a specular reflection portion and a diffuse reflection portion;

extracting, by the at least one processor, light information including a light vector of at least one light from the specular reflection portion and the diffuse reflection portion and shape information including geometric information of the input image; and extracting, by the at least one processor, texture information from the specular reflection portion, the diffuse reflection portion and the shape information.

23. The method of claim 22, wherein the light information includes a light direction of at least one light determined responsive to the specular reflection portion and the diffuse reflection portion.

24. The method of claim 23, further comprising:

generating a light direction map responsive to the light information of the at least one light and generating a light intensity map by applying the light direction map to the specular reflection portion.

25. At least one non-transitory computer readable recording medium comprising computer readable instructions that control at least one processor to implement a method, comprising:

inverse rendering an input image into a specular reflection portion and a diffuse reflection portion;

extracting light information including a light vector of at least one light from the specular reflection portion and the diffuse reflection portion and shape information including geometric information of the input image; and extracting texture information from the specular reflection portion, the diffuse reflection portion and the shape information.

* * * * *